(12) United States Patent
Beck et al.

(10) Patent No.: US 10,533,643 B2
(45) Date of Patent: Jan. 14, 2020

(54) VEHICLE TRANSMISSION

(71) Applicant: ZF Friedrichshafen AG, Friedrichshafen (DE)

(72) Inventors: Stefan Beck, Eriskirch (DE); Max Bachmann, Friedrichshafen (DE); Martin Brehmer, Tettnang (DE); Anton Fritzer, Markdorf (DE); Suryanto Hendrawan, Constance (DE); Matthias Horn, Tettnang (DE); Johannes Kaltenbach, Friedrichshafen (DE); Raffael Kuberczyk, Ravensburg (DE); Jens Moraw, Friedrichshafen (DE); Gerhard Niederbrucker, Friedrichshafen (DE); Juri Pawlakowitsch, Kressbronn (DE); Martin Rattay, Ravensburg (DE); Matthias Reisch, Ravensburg (DE); Wolfgang Rieger, Friedrichshafen (DE); Thomas Rosemeier, Meckenbeuren (DE); Lara Ruth Turner, Immenstaad (DE); Michael Roske, Friedrichshafen (DE); Viktor Warth, Friedrichshafen (DE); Bernd Unseld, Ravensburg (DE); Michael Wechs, Weißensberg (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 87 days.

(21) Appl. No.: 15/925,205

(22) Filed: Mar. 19, 2018

(65) Prior Publication Data

US 2018/0266526 A1    Sep. 20, 2018

(30) Foreign Application Priority Data

Mar. 20, 2017  (DE) .......................... 10 2017 204 547

(51) Int. Cl.
*F16H 3/66* (2006.01)
*B60K 6/48* (2007.10)
*B60K 6/365* (2007.10)

(52) U.S. Cl.
CPC ............... *F16H 3/66* (2013.01); *B60K 6/365* (2013.01); *B60K 6/48* (2013.01);
(Continued)

(58) Field of Classification Search
CPC ......... F16H 2200/006; F16H 2200/201; F16H 2200/2046; F16H 2200/2048; F16H 2200/2051; F16H 2200/2097
See application file for complete search history.

(56) References Cited

U.S. PATENT DOCUMENTS 6,709,360 B2    3/2004  Raghavan et al.
9,506,531 B2   11/2016  Beck
(Continued)

FOREIGN PATENT DOCUMENTS

DE         10162888 A1   7/2003
DE      102012207099 A1  10/2013
(Continued)

OTHER PUBLICATIONS

German Search Report DE102017204547.7, dated Jan. 26, 2018. (8 pages).

*Primary Examiner* — Timothy Hannon
(74) *Attorney, Agent, or Firm* — Dority & Manning, P.A.

(57) ABSTRACT

A transmission for a motor vehicle wherein the drive shaft (An) is rotationally fixedly connectable by the first shift element (K3) to the first shaft (1) and the first shaft is rotationally fixedly connectable by the second shift element (B2) to the housing (2). A sun gear of the first planetary gear set (RS1) is rotationally fixedly connectable by the third shift element (K2) to the drive shaft (An). A carrier of the
(Continued)

first planetary gear set (RS1) is rotationally fixedly connected to the output shaft (Ab) and to a ring gear of the second planetary gear set (RS2). A ring gear of the first planetary gear set (RS1) is rotationally fixedly connected to the second shaft (3), wherein the second shaft (3) is rotationally fixedly connectable by the fourth shift element (B1) to the housing (2).

12 Claims, 6 Drawing Sheets

(52) U.S. Cl.
CPC .. *F16H 2200/006* (2013.01); *F16H 2200/201* (2013.01); *F16H 2200/2046* (2013.01); *F16H 2200/2048* (2013.01); *F16H 2200/2051* (2013.01); *F16H 2200/2097* (2013.01)

(56) References Cited

U.S. PATENT DOCUMENTS

| 2004/0087409 | A1* | 5/2004 | Lee | F16H 3/66 |
| | | | | 475/269 |
| 2009/0312141 | A1* | 12/2009 | Jang | F16H 3/666 |
| | | | | 475/275 |

FOREIGN PATENT DOCUMENTS

| EP | 1387112 A2 | 2/2004 |
| JP | 2009133384 A | 6/2009 |

* cited by examiner

| Gear | Engaged Shift Elements | | | | | |
|---|---|---|---|---|---|---|
| | Brake | | Clutch | | | |
| | B1 | B2 | K1 | K2 | K3 | K4 |
| G1 | X | | | X | | |
| G2 | | X | | X | | |
| G3 | | | | X | X | |
| G4 | | | X | X | | |
| G5 | | | X | | X | |
| G6 | | | X | | | X |
| G7 | | X | X | | | |
| G8 | | | | | X | X |
| R1 | X | | | | X | |
| ZV | | | | X | | X |

Fig. 6

VEHICLE TRANSMISSION

FIELD OF THE INVENTION

The invention relates generally to a transmission for a motor vehicle, having a drive shaft, an output shaft, a first planetary gear set, a second planetary gear set and a third planetary gear set. The invention furthermore relates to a hybrid transmission having a transmission of said type. The invention furthermore relates to a vehicle having the transmission or the hybrid transmission.

BACKGROUND

The prior art has disclosed a multiplicity of transmissions that are usable in motor vehicles. For example, DE 10 162 888 A1 has disclosed a transmission having three planetary gear sets and six shift elements, by which multiple gear ratios are providable.

SUMMARY OF THE INVENTION

Therefore, the object of the invention is to provide an improved transmission which is suitable for front-transverse installation in a motor vehicle and for hybridization.

The object is achieved by a transmission of the type mentioned in the introduction, which is characterized in that the drive shaft is rotationally fixedly connectable by a first shift element to a first shaft and the first shaft is rotationally fixedly connectable by a second shift element to a housing. A sun gear of the first planetary gear set is rotationally fixedly connectable by a third shift element to the drive shaft, a carrier of the first planetary gear set is rotationally fixedly connected to the output shaft and to a ring gear of the second planetary gear set. A ring gear of the first planetary gear set is rotationally fixedly connected to a second shaft, wherein the second shaft is rotationally fixedly connectable by a fourth shift element to the housing. A carrier of the second planetary gear set is rotationally fixedly connectable by a fifth shift element to the drive shaft and is rotationally fixedly connected to a ring gear of the third planetary gear set. A sun gear of the second planetary gear set is rotationally fixedly connected to the first shaft, and a sun gear of the third planetary gear set is rotationally fixedly connected to the housing. Additionally, a carrier of the third planetary gear set is rotationally fixedly connectable by a sixth shift element to the first shaft and is rotationally fixedly connected to the second shaft.

The transmission according to the invention has the advantage that it can be of small construction, such that the transmission is suitable for front-transverse installation. The transmission furthermore exhibits low component loads and low transmission losses. Furthermore, the transmission exhibits good toothing efficiency and a good transmission ratio series. As will be described in more detail below, the transmission can also be easily operatively connected to an electric machine, such that at least hybrid traction operation is realizable.

A shaft is to be understood not to exclusively mean, for example, a cylindrical, rotatably mounted machine element for transmitting torques, but to also mean general connecting elements which connect individual components or elements to one another, in particular connecting elements which rotationally fixedly connect multiple elements to one another.

A rotationally fixed connection is understood to mean a connection between two components such that the two components connected to one another always have the same rotational speed. This is not the case if, for example, a shift element is situated between the two components connected to one another, which shift element is in the open state. The rotationally fixed connection may be realized, for example, by a spline toothing.

The housing may be a transmission housing, which is static during operation of the transmission, such that the transmission housing does not rotate during operation. The three planetary gear sets may be arranged in a cavity of the transmission housing.

In a very particular embodiment, the first shift element, the third shift element, the fifth shift element and the sixth shift element may be clutches. Furthermore, the second shift element and the fourth shift element may be brakes. As a result, a transmission of simple construction with three planetary gear sets, four clutches and two brakes are providable. It is very particularly advantageous if the fourth shift element and/or the third shift element are positively locking shift elements. The positively locking shift elements may, for example, be dog or synchronizing means.

The output shaft may extend transversely, in particular perpendicularly, with respect to the drive shaft. In this way, a transmission is provided which is particularly well suited to front-transverse installation in a motor vehicle.

A hybrid transmission having the transmission and the electric machine is particularly advantageous. The electric machine may be operatively connected or operatively connectable to the transmission. Through the provision of the electric machine, purely internal-combustion-engine-powered or hybrid traction operation is possible.

The electric machine is composed at least of a static stator and a rotatably mounted rotor, and is configured to convert electrical energy into mechanical energy in the form of rotational speed and torque in a motor operating mode, and to convert mechanical energy into electrical energy in the form of electrical current and voltage in a generator operating mode. The rotor may be rotationally fixedly connected to a rotor shaft. The electric machine may be arranged in an interior space surrounded by the housing and/or may be rotationally fixedly connected to the housing.

The electric machine may be operatively connectable by a seventh shift element to the output shaft. The seventh shift element may be a clutch. Here, the seventh shift element may serve as a launch element, for example, during purely electric traction operation. Alternatively, at least one, in particular exactly one or exactly two, of the abovementioned six shift elements may serve as launch element(s).

The electric machine may be rotationally fixedly connected or rotationally fixedly connectable to the drive shaft. For example, the electric machine may be rotationally fixedly connected directly to the drive shaft by the rotor shaft. Alternatively, the rotor shaft may be rotationally fixedly connectable by the seventh shift element to the rotor shaft.

Alternatively, the electric machine may be operatively connected or operatively connectable by at least one toothed gear to the drive shaft. For this purpose, the rotor shaft may be rotationally fixedly connected to the toothed gear. The toothed gear may be in engagement with another toothed gear, which is rotationally fixedly connected to the drive shaft. It is possible for multiple further toothed gears to be provided which are operatively connected to the toothed gear and to the other toothed gear. The toothed gear may be operatively connected to the other toothed gear by the further toothed gears. The seventh shift element may be provided in the drive train between the electric machine and the drive shaft.

In an alternative embodiment, the electric machine may be operatively connected or operatively connectable by a traction mechanism, such as, for example, a chain, to the drive shaft. The seventh shift element may be provided in the drive train between the electric machine and the drive shaft. As a result, the electric machine can be easily operatively connected or operatively connectable to the drive shaft, such that it is ensured that the torque provided by the electric machine is transmittable to the drive shaft.

In one particular embodiment, the hybrid transmission may have an eighth shift element. The eighth shift element serves for operatively connecting the drive shaft to an output shaft of a motor vehicle drive unit, for example, of an internal combustion engine. Through the eighth shift element, the motor vehicle drive unit can be decoupled from the transmission, such that purely electric traction operation is possible.

The transmission may be a multi-ratio transmission through which at least eight gear ratios, in particular exactly eight gear ratios, for forward traction operation of the motor vehicle is realizable. Furthermore, at least one, in particular exactly one, reverse gear ratio for reverse traction operation of the motor vehicle and at least one, in particular exactly one, intermediate gear ratio is realizable through the transmission.

In particular, the following gear ratios between the drive shaft and the output shaft are realizable by selective closure of two of the six shift elements:

A first gear ratio is realizable by closing the fourth shift element and the third shift element, wherein the remaining shift elements are open. A second gear ratio is realizable by closing the second shift element and the third shift element, wherein the remaining shift elements are open. Furthermore, a third gear ratio is realizable by closing the first shift element and the third shift element, wherein the remaining shift elements are open. A fourth gear ratio is realizable by closing the third shift element and the fifth shift element, wherein the remaining shift elements are open. By contrast, a fifth gear ratio is realizable by closing the first shift element and the fifth shift element, wherein the remaining shift elements are open. A sixth gear ratio is realizable by closing the fifth shift element and the sixth shift element, wherein the remaining shift elements are open. Furthermore, a seventh gear ratio is realizable by closing the second shift element and the fifth shift element, wherein the remaining shift elements are open. An eighth gear ratio is realizable by closing the first shift element and the sixth shift element, wherein the remaining shift elements are open.

Through the transmission, it is furthermore possible for a reverse gear ratio to be realized by closing the first shift element and the fourth shift element, wherein the remaining shift elements are open. An intermediate gear ratio is realizable by closing the third shift element and the sixth shift element, wherein the remaining shift elements are open.

To realize a transmission of said type, the transmission may have at least three planetary gear sets, in particular exactly three planetary gear sets, and at least six shift elements, in particular exactly six shift elements. The gear ratios of the transmission each be realizable by closing exactly two shift elements.

A motor vehicle having the transmission or the hybrid transmission is particularly advantageous.

BRIEF DESCRIPTION OF THE DRAWINGS

The subject matter of the invention is schematically illustrated in the figures and will be described below. In the figures, the following is shown:

FIG. 6 shows an engagement sequence diagram of the transmission illustrated in FIGS. 1 to 5.

DETAILED DESCRIPTION

Figure 1:
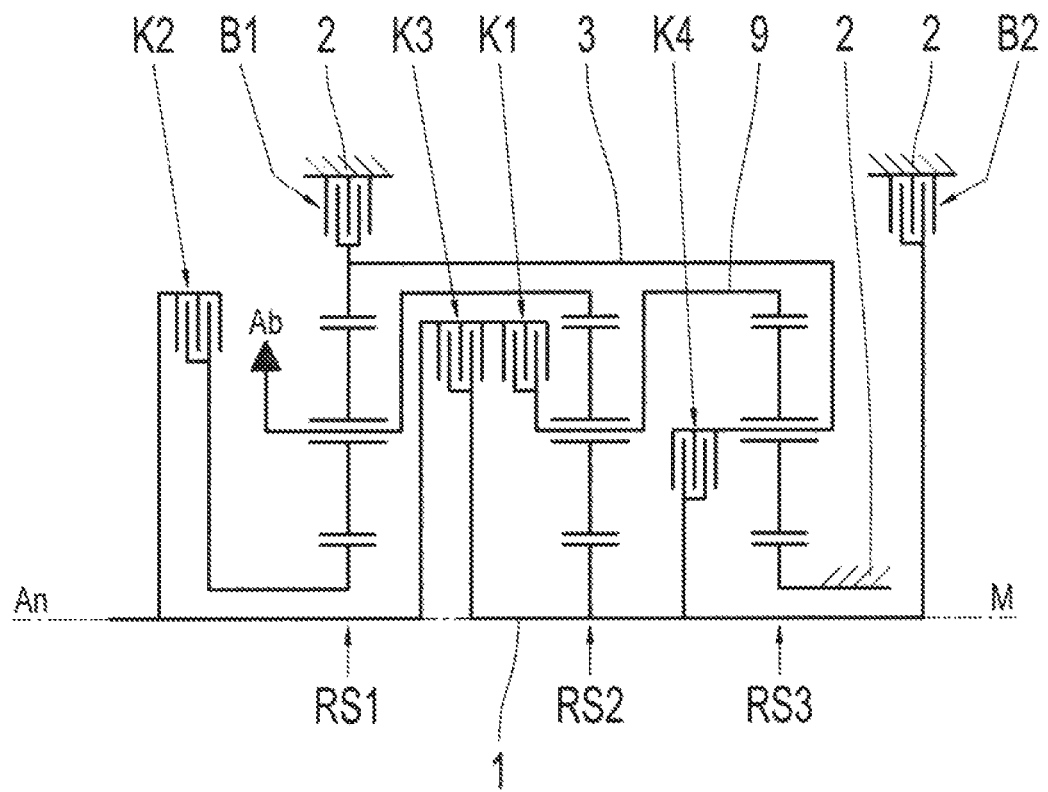
FIG. 1 shows a transmission diagram of the transmission according to the invention as per a first embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The transmission as per the first exemplary embodiment, as shown in FIG. 1, has a drive shaft An, a first planetary gear set RS1, a second planetary gear set RS2 and a third planetary gear set RS3. The transmission furthermore has a first shift element K3, a second shift element B2, a third shift element K2, a fourth shift element B1, a fifth shift element K1 and a sixth shift element K4. The transmission shown in FIG. 1 is rotationally symmetrical with respect to a central axis M of the transmission, wherein only the upper part of the transmission is illustrated in FIG. 1.

In the transmission, the drive shaft An is rotationally fixedly connectable by the first shift element K3 to a first shaft 1. The first shaft 1 is rotationally fixedly connectable by the second shift element B2 to a static housing 2. The housing 2 is the transmission housing. A sun gear of the first planetary gear set RS1 is rotationally fixedly connectable by the third shift element K2 to the drive shaft An. A carrier of the first planetary gear set RS1 is rotationally fixedly connected to the output shaft Ab. Furthermore, the carrier of the first planetary gear set RS1 is rotationally fixedly connected to a ring gear of the second planetary gear set RS2. A ring gear of the second planetary gear set RS1 is rotationally fixedly connected to a second shaft 3.

The second shaft 3 is rotationally fixedly connectable by the fourth shift element B1 to the housing 2. A carrier of the second planetary gear set RS2 is rotationally fixedly connectable by the fifth shift element K1 to the drive shaft An. Furthermore, the carrier of the second planetary gear set RS2 is rotationally fixedly connected to a ring gear of the third planetary gear set RS3. A sun gear of the second planetary gear set RS2 is rotationally fixedly connected to the first shaft 1.

A sun gear of the third planetary gear set RS3 is rotationally fixedly connected to the housing 2. A carrier of the third planetary gear set RS3 is rotationally fixedly connectable by a sixth shift element K4 to the first shaft 1. Furthermore, the carrier of the third planetary gear set RS3 is rotationally fixedly connected to the second shaft 3.

The second shaft 3 extends through the carrier of the third planetary gear set RS3 and is rotationally fixedly connectable, at its end remote from the ring gear of the first planetary gear set RS1, by the sixth shift element K4 to the first shaft 1. The rotationally fixed connection of the carrier of the second planetary gear set RS2 to the ring gear of the third planetary gear set RS3 is realized by a third shaft 9. The third shaft 9 is, at one end, rotationally fixedly connectable by the fifth shift element K1 to the drive shaft An and extends through the carrier of the second planetary gear set RS2 and, at its other end, is rotationally fixedly connected to the ring gear of the third planetary gear set RS3. The output shaft Ab extends through the carrier of the first planetary gear set RS1 and is rotationally fixedly connected to the ring gear of the second planetary gear set RS2.

The first, third, fifth and sixth shift elements K3, K2, K1, K4 are clutches. The second and fourth shift elements B2, B1 are brakes. The output shaft Ab runs perpendicular to the drive shaft An. The drive shaft An is operatively connected or operatively connectable to a motor vehicle drive unit (not illustrated).

Figure 2:
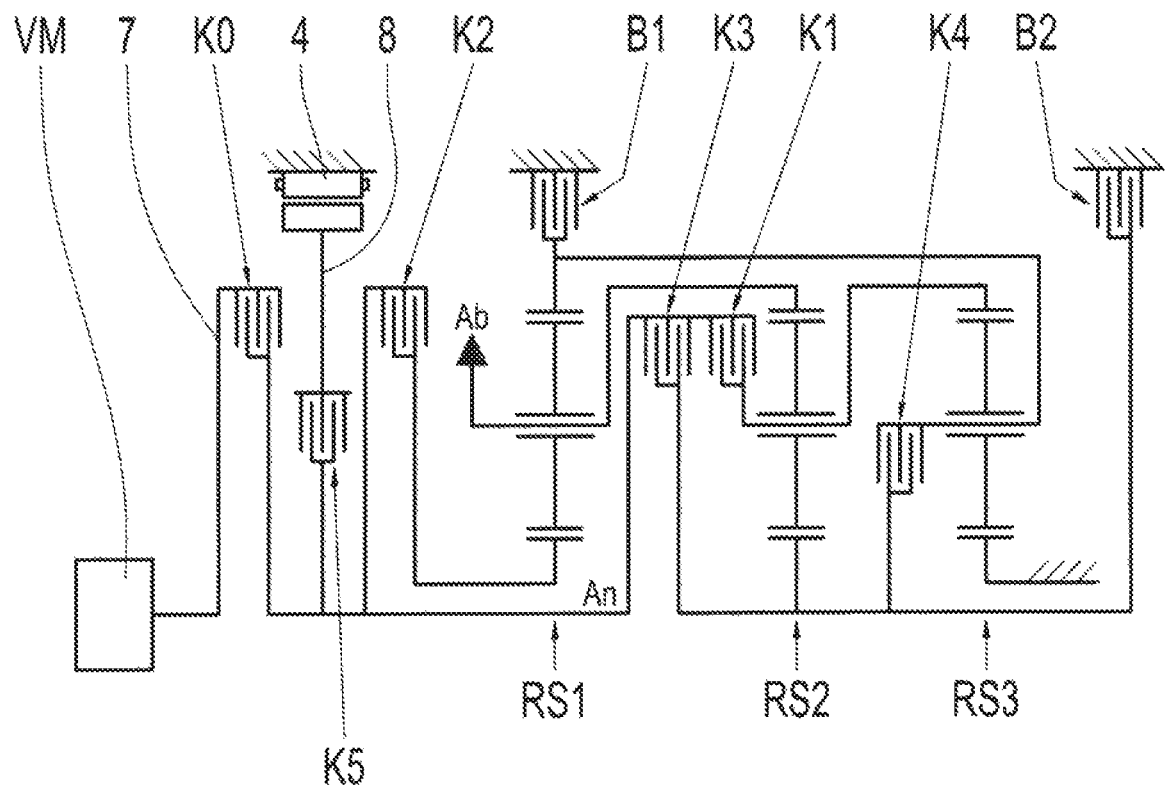
FIG. 2 shows a hybrid transmission as per a first exemplary embodiment having the transmission according to the invention.

FIG. 2 shows a hybrid transmission as per a first exemplary embodiment. The hybrid transmission differs from the transmission illustrated in FIG. 1 in that, in addition to the transmission shown in FIG. 1, it has an electric machine 4. The electric machine 4 is arranged coaxially with respect to the drive shaft An. The electric machine 4 is rotationally fixedly connected to a rotor shaft 8. The rotor shaft 8 is rotationally fixedly connectable by a seventh shift element K5 to the drive shaft An. The seventh shift element K5 serves as launch element during a launch by the electric machine 4, and/or is a clutch.

A further difference consists in that the hybrid transmission has an eighth shift element K0. The motor vehicle drive unit VM can be activated by the eighth shift element K0. In particular, an output shaft 7 of the motor vehicle drive unit VM is rotationally fixedly connectable by the eighth shift element K0 to the drive shaft An. Through the eighth shift element K0, the motor vehicle drive unit VM can be decoupled from the hybrid transmission, such that purely electric traction operation is possible.

Figure 3:
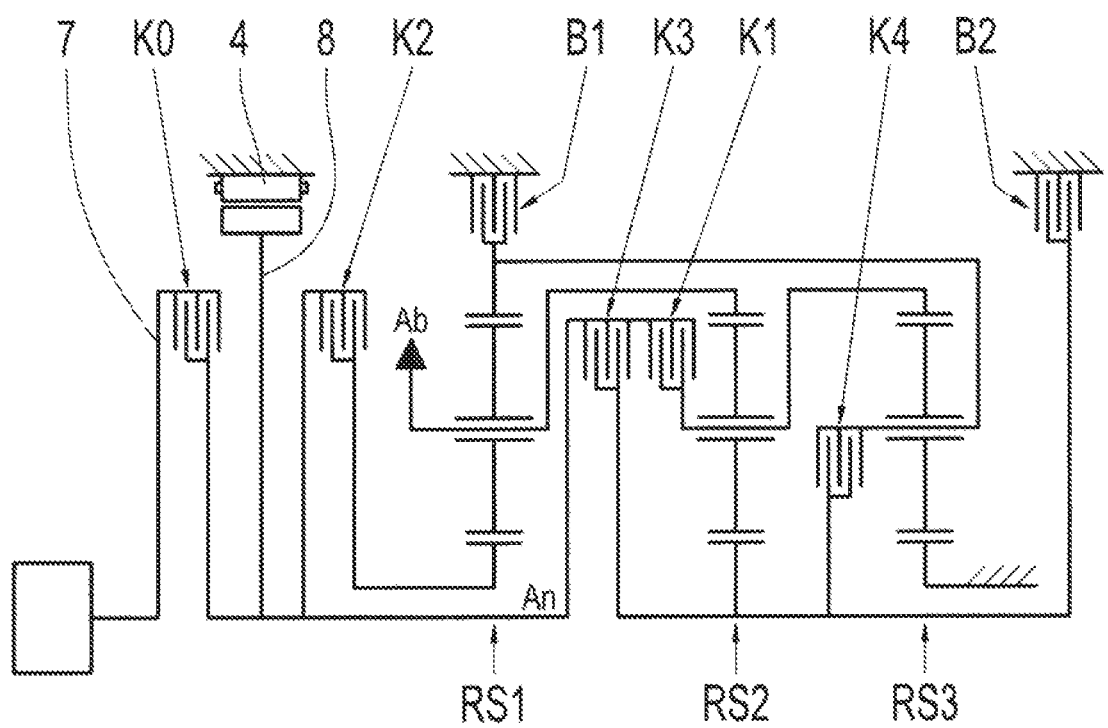
FIG. 3 shows a hybrid transmission as per a second exemplary embodiment having the transmission according to the invention.

FIG. 3 shows a hybrid transmission as per a second exemplary embodiment. The hybrid transmission illustrated in FIG. 3 differs from the hybrid transmission illustrated in FIG. 2 in terms of the coupling of the electric machine 4 to the drive shaft An. The rotor shaft 8 is thus directly rotationally fixedly connected to the drive shaft An.

Figure 4:
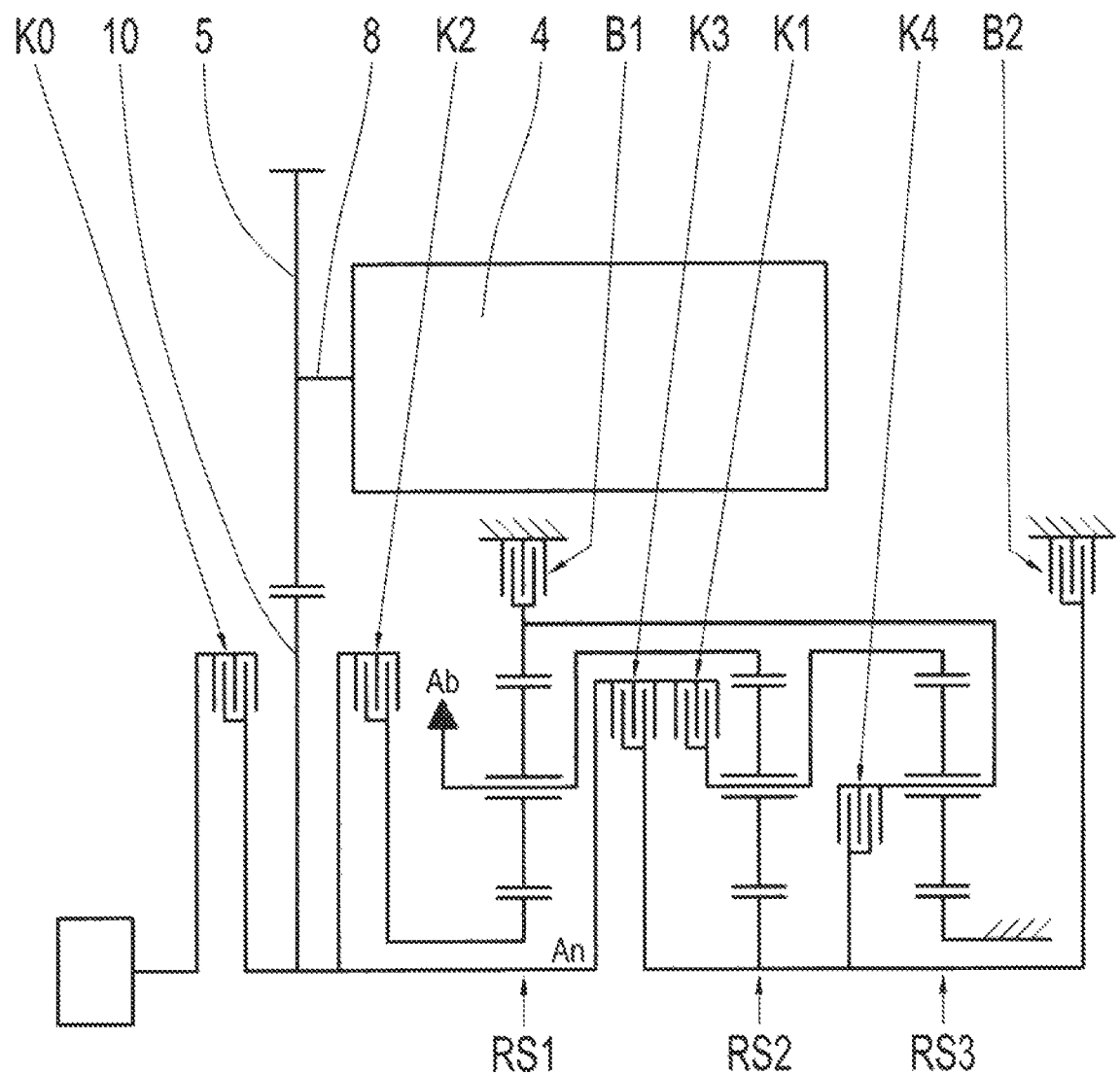
FIG. 4 shows a hybrid transmission as per a third exemplary embodiment having the transmission according to the invention.

The hybrid transmission as per a third exemplary embodiment, as illustrated in FIG. 4, differs from the hybrid transmission illustrated in FIG. 3 in that the rotor shaft 8 is directly rotationally fixedly connected to a toothed gear 5. The toothed gear 5 meshes with another toothed gear 10, which is rotationally fixedly connected to the drive shaft An. A further difference consists in that the electric machine 4 is arranged axially parallel with respect to the drive shaft An and/or to the transmission central axis M.

Figure 5:
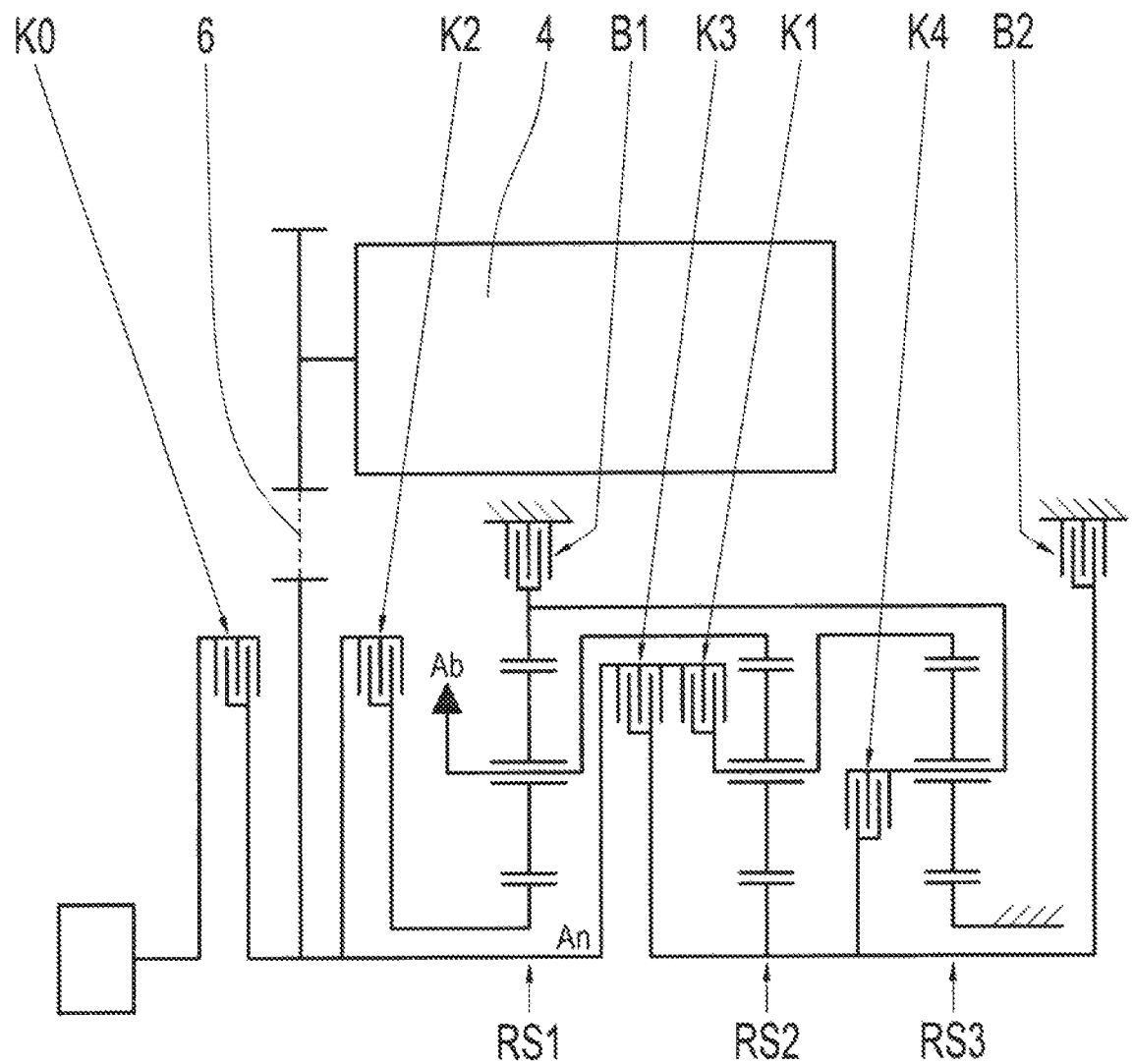
FIG. 5 shows a hybrid transmission as per a fourth exemplary embodiment having the transmission according to the invention.

The hybrid transmission as per a fourth exemplary embodiment, as illustrated in FIG. 5, differs from the hybrid transmission as per a third exemplary embodiment, as illustrated in FIG. 4, in that the electric machine 4 is operatively connected by a traction mechanism drive to the drive shaft An. The traction mechanism drive has a traction mechanism 6, such as, for example, a chain.

FIG. 6 shows an engagement sequence diagram for the transmission shown in FIGS. 1 to 5. Shift elements which are closed are denoted by the symbol "X". Shift elements which are not denoted by the symbol "X" are situated in an open state.

The transmission illustrated in FIG. 1 has eight gear ratios G1 to G8 for forward traction operation. Furthermore, the transmission has a single reverse gear ratio R1 for reverse traction operation. The transmission furthermore has an intermediate gear ratio ZV. The individual gear ratios are realizable by closing exactly two shift elements. All of the abovementioned gear ratios are implementable in purely electric traction operation or in hybrid traction operation or in purely mechanical traction operation.

Modifications and variations can be made to the embodiments illustrated or described herein without departing from the scope and spirit of the invention as set forth in the appended claims.

REFERENCE NUMERALS

1 Shaft
2 Housing
3 Second shaft
4 Electric machine
5 Toothed gear
6 Traction mechanism
7 Output shaft
8 Rotor shaft
9 Third shaft
10 Other toothed gear
M Central axis
B1 Fourth shift element
B2 Second shift element
G1 First gear ratio
G2 Second gear ratio
G3 Third gear ratio
G4 Fourth gear ratio
G5 Fifth gear ratio
G6 Sixth gear ratio
G7 Seventh gear ratio
G8 Eighth gear ratio
R1 Reverse gear ratio
ZV Intermediate gear ratio
K0 Eighth shift element
K1 Fifth shift element
K2 Third shift element
K3 First shift element
K4 Sixth shift element
K5 Seventh shift element
An Drive shaft
Ab Output shaft
VM Motor vehicle drive unit
RS1 First planetary gear set
RS2 Second planetary gear set
RS3 Third planetary gear set

The invention claimed is:
1. A transmission for a motor vehicle, comprising:
a drive shaft (An);
an output shaft (Ab);
first, second and third planetary gear sets (RS1, RS2, RS3);
first, second, third, fourth, fifth and sixth shift elements (K3, B2, K2, B1, K1, K4);
a housing (2); and
first and second shafts (1, 3), wherein the drive shaft (An) is rotationally fixedly connectable by the first shift element (K3) to the first shaft (1) and the first shaft is rotationally fixedly connectable by the second shift element (B2) to the housing (2), wherein a sun gear of the first planetary gear set (RS1) is rotationally fixedly connectable by the third shift element (K2) to the drive shaft (An), a carrier of the first planetary gear set (RS1) is rotationally fixedly connected to the output shaft (Ab) and to a ring gear of the second planetary gear set (RS2), and a ring gear of the first planetary gear set (RS1) is rotationally fixedly connected to the second shaft (3), the second shaft (3) is rotationally fixedly connectable by the fourth shift element (B1) to the housing (2), wherein a carrier of the second planetary gear set (RS2) is rotationally fixedly connectable by the fifth shift element (K1) to the drive shaft (An) and is rotationally fixedly connected to a ring gear of the third planetary gear set (RS3), and a sun gear of the second planetary gear set (RS2) is rotationally fixedly connected to the first shaft (1), and wherein a sun gear of the third planetary gear set (RS3) is rotationally fixedly connected to the housing (2), and a carrier of the third planetary gear set (RS3) is rotationally fixedly connectable by the sixth shift element (K4) to the first shaft (1) and is rotationally fixedly connected to the second shaft (3).

2. The transmission of claim 1, wherein the first shift element (K3), the third shift element (K2), the fifth shift element (K1) and the sixth shift element (K4) are clutches.

3. The transmission of claim 1, wherein the second shift element (B2) and the fourth shift element (B1) are brakes.

4. The transmission of claim 1, wherein the fourth shift element (B1) and/or the third shift element (K2) are positively locking shift elements.

5. The transmission of claim 1, wherein the output shaft (Ab) extends transversely with respect to the drive shaft (An).

6. The transmission of claim 1, wherein:
a first gear ratio (G1) is selectively realizable by closing the fourth shift element (B1) and the third shift element (K2) with the remaining shift elements being open;
a second gear ratio (G2) is selectively realizable by closing the second shift element (B2) and the third shift element (K2) with the remaining shift elements being open;
a third gear ratio (G3) is selectively realizable by closing the first shift element (K3) and the third shift element (K2) with the remaining shift elements being open;
a fourth gear ratio (G4) is selectively realizable by closing the third shift element (K2) and the fifth shift element (K1) with the remaining shift elements being open;
a fifth gear ratio (G5) is selectively realizable by closing the first shift element (K3) and the fifth shift element (K1) with the remaining shift elements being open;
a sixth gear ratio (G6) is selectively realizable by closing the fifth shift element (K1) and the sixth shift element (K4) with the remaining shift elements being open;
a seventh gear ratio (G7) is selectively realizable by closing the second shift element (B2) and the fifth shift element (K1) with the remaining shift elements being open;
an eighth gear ratio (G8) is selectively realizable by closing the first shift element (K3) and the sixth shift element (K4) with the remaining shift elements being open;
a reverse gear ratio (R1) is selectively realizable by closing the first shift element (K3) and the fourth shift element (B1) with the remaining shift elements being open; and
an intermediate gear ratio (ZV) is selectively realizable by closing the third shift element (K2) and the sixth shift element (K4) with the remaining shift elements being open.

7. A hybrid transmission having a transmission according to claim 1 and an electric machine (4), wherein the electric machine (4) is operatively connected or operatively connectable to the transmission.

8. The hybrid transmission according to claim 7, wherein the electric machine (4) is operatively connectable by a seventh shift element (K5) to the drive shaft (An).

9. The hybrid transmission according to claim 8, wherein the electric machine (4) is rotationally fixedly connected or connectable to the drive shaft (An) or is operatively connected or operatively connectable to the drive shaft (An) by at least one toothed gear (5) or by a traction mechanism (6).

10. The hybrid transmission according to claim 7, further comprising an eighth shift element (K0) for operatively connecting the drive shaft (An) to an output shaft (7) of a motor vehicle drive unit.

11. A motor vehicle having a hybrid transmission according to claim 7.

12. A motor vehicle having a transmission according to claim 1.

* * * * *